US005555013A

United States Patent [19]

Mori et al.

[11] Patent Number: 5,555,013

[45] Date of Patent: Sep. 10, 1996

[54] DRIVING DEVICE FOR DRIVING AND END-LUMINESCENT LINE HEAD

[75] Inventors: Hidekazu Mori; Juntaro Oku, both of Shizuoka, Japan

[73] Assignee: Kabushiki Kaisha TEC, Shizuoka, Japan

[21] Appl. No.: 108,304

[22] Filed: Aug. 19, 1993

[30] Foreign Application Priority Data

Aug. 20, 1992 [JP] Japan .................................. 4-221040

[51] Int. Cl.[6] .............................. B41J 2/47; B41J 2/435; H02H 7/10

[52] U.S. Cl. ............................................ 347/237; 363/50

[58] Field of Search ................................... 347/237, 247, 347/132, 168, 211, 238, 156, 192, 234; 363/50, 51; 358/350; 361/42, 49

[56] References Cited

U.S. PATENT DOCUMENTS 4,401,990 8/1983 Aiba et al. ............................ 347/156
5,144,364 9/1992 Ichikawa ............................... 347/132
5,371,525 6/1994 Murano ................................ 347/247

FOREIGN PATENT DOCUMENTS 3-256074 3/1990 Japan .
3-263068 3/1990 Japan .

*Primary Examiner*—Benjamin R. Fuller
*Assistant Examiner*—Thinh Nguyen
*Attorney, Agent, or Firm*—Oblon, Spivak, McClelland, Maier, & Neustadt, P.C.

[57] ABSTRACT

A driving device for driving an end-luminescent line head provided with an array of end-luminescent EL elements includes a power supply, a high-voltage unit having an input side connected to the output side of the power supply and capable of generating a positive voltage and a negative voltage, a driver for driving the end-luminescent line head, connected to the output side of the high-voltage unit, voltage detecting device for detecting the drop of the output voltage of the power supply, and discharge device having one side connected to the output side of the high-voltage unit and the other side connected to the ground. The discharge devices closed to discharge the high-voltage unit immediately after the power supply has been turned off, to protect the driver and the end-luminescent line head from destruction.

6 Claims, 6 Drawing Sheets

DRIVING DEVICE FOR DRIVING AND END-LUMINESCENT LINE HEAD

BACKGROUND OF THE INVENTION

1. Field of the Invention

The present invention relates to a driving device for driving an end-luminescent line head provided with end-luminescent electroluminescent elements (EL elements) arranged in an array.

2. Description of the Related Art

A recently developed electrophotographic line printer is one of electrophotographic printers. The electrophotographic line printer comprises a photoconductive drum, a charger, a line head, a developing unit and a transfer unit, which are arranged closely around the photoconductive drum. The luminescent elements of the line head project light signals corresponding to image signals on the circumference of the photoconductive drum charged by the charger to form an electrostatic latent image on the circumference of the photoconductive drum, the developing unit applies toner to the circumference of the photoconductive drum to develop the electrostatic latent image in a toner image, and then, the transfer unit transfers the toner image to a recording sheet. Trials have been made to use end-luminescent EL elements as luminescent elements for the line head.

As shown in FIG. 6, an end-luminescent EL element 56 is formed, for example, by sandwiching an active layer 51 of a zinc sulfide containing an active element between dielectric layers 52 and 53, and forming flat electrodes 54 and 55 respectively on the outer surfaces of the dielectric layers 52 and 53. When a voltage is applied across the flat electrodes 54 and 55 of the end-luminescent EL element 56, the active layer 51 emits flat light beams through its end surfaces. As shown by way of example in FIG. 7, an end-luminescent line head 58 comprises a substrate 57, a plurality of linear end-luminescent EL elements 56 formed on the substrate 57 in a parallel arrangement by a thin-film forming process, and a rod lens array, not shown, disposed opposite to the end surfaces of the end-luminescent EL elements.

FIG. 8 shows a known driving circuit for driving the end-luminescent line head 58 provided with m×n end-luminescent EL elements 56. The driving circuit has m common electrodes and n channel electrodes for the matrix driving of the m×n end-luminescent EL elements 5. 6A power supply 59 applies a supply voltage of 24 V to a high-voltage unit 60. Then, the high-voltage unit 60 applies a positive voltage $V_P$ and a negative voltage $V_N$ to a common driver 61 having a plurality of transistor circuits, not shown, for alternately applying the voltages $V_P$ and $V_N$ to the common electrodes of the end-luminescent line head 58. A channel driver included in a controller 62 applies a driving voltage to the channel electrodes of the end-luminescent line head 58. The channel driver is provided with a plurality of transistor circuits for selectively applying an input voltage to the channel electrodes of the end-luminescent line head 58 according to print signals. Each end-luminescent EL element 56 of the end-luminescent line head 58 emits light when the voltages applied to the common electrode and the channel electrode connected thereto exceed a threshold voltage. The controller 62 controls the respective transistor circuits of the common driver 61 and the channel driver for synchronous operation to drive the end-luminescent EL elements 56 of the end-luminescent line head 58 selectively for light emission.

The power supply 59 applies a voltage of +5 V as a logic voltage to the controller 62, i.e., a control circuit.

When the power supply 59 of the driving circuit shown in FIG. 8 is disconnected from the circuits, the outputs of the high-voltage unit 60 drops to a ground level (GND). Then, the output $V_P$ of the high-voltage unit 60 starts falling to GND and the output $V_N$ of the high-voltage unit 60 starts rising to GND with a delay after the output voltage of 24 V of the power supply 59 has started falling to GND as shown in FIG. 9. Whereas the high voltages $V_P$ and $V_N$ are applied continuously to the common driver 61 during this delay, application of the logic voltage of 5 V to the control circuit is interrupted immediately after the power supply 59 has been turned off. Consequently, the transistor circuits of the common driver 61 become unstable and there is the possibility that the common driver 61 and the end-luminescent line head 58 are destructed.

SUMMARY OF THE INVENTION

Accordingly, it is an object of the present invention to provide a driving device for driving an end-luminescent line head, capable of preventing the destruction of the common driver thereof and the end-luminescent line head connected thereto which is possible to occur when the power supply thereof is turned off.

According to the present invention, a driver for driving an end-luminescent line head provided with an array of a plurality of end-luminescent EL elements, and a power supply for supplying power to the driver are interconnected by a high-voltage unit that generates a positive voltage and a negative voltage, a voltage detector detects the drop of the output voltage of the power supply, and a discharge unit having one end connected to the output side of the high-voltage unit and the other end connected to a ground is closed to discharge the high-voltage unit upon the detection of the drop of the output voltage of the power supply by the voltage detector to protect the driver and the end-luminescent line head from destruction by avoiding driving the driver after application of the logic voltage to the control system by the power supply has been interrupted.

DETAILED DESCRIPTION OF THE PREFERRED EMBODIMENTS

A driving device in a first embodiment according to the present invention for driving an end-luminescent line head will be described hereinafter with reference to FIGS. 1 to 4.

Figure 1:
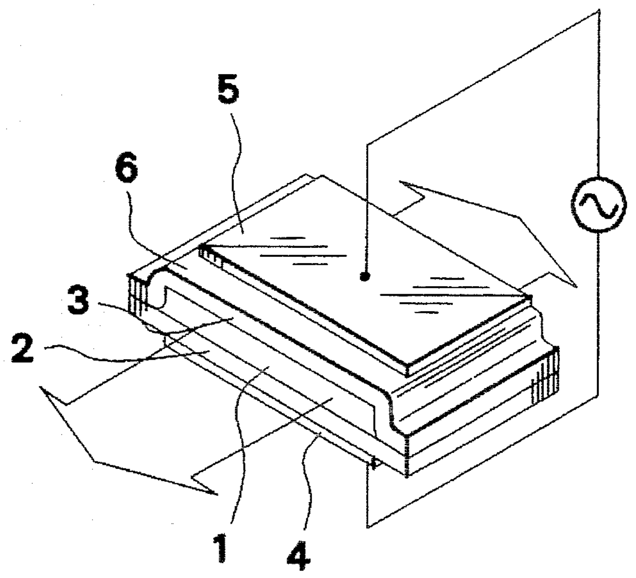
FIG. 1 is a perspective view of an end-luminescent EL element employed in an end-luminescent line head to be driven by a driving device in a first embodiment according to the present invention.
Figure 2:
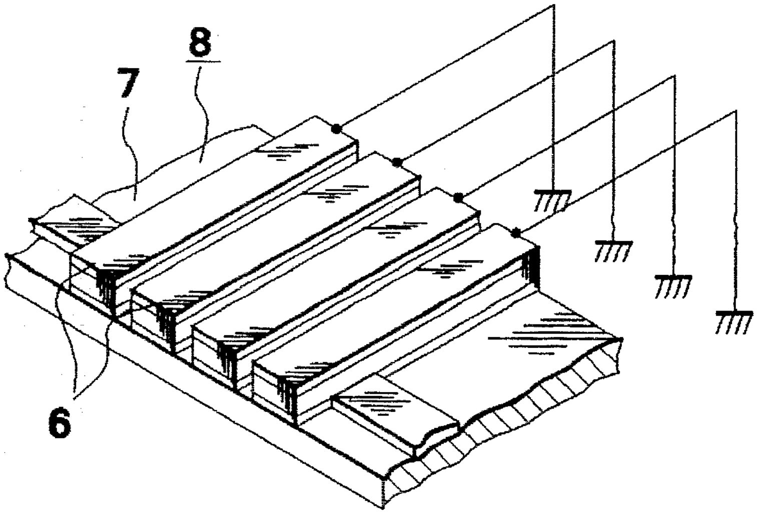
FIG. 2 is an end-luminescent line head provided with end-luminescent EL elements.

Referring to FIGS. 1 and 2, an end-luminescent line head 8 is fabricated by forming a plurality of end-luminescent EL elements 6 in a parallel arrangement on a substrate 7 by a thin-film forming process, and disposing an array of rod lenses, not shown, opposite to the respective end surfaces of the end-luminescent EL elements 6. Each end-luminescent EL element 6 is formed by sandwiching an active layer 1, a thin film, of zinc sulfide containing an active element between dielectric layers 2 and 3, and forming flat electrodes 4 and 5 respectively on the outer surfaces of the dielectric layers 2 and 3. When a voltage is applied across the flat electrodes 4 and 5, the active layer 1 emits a flat light beam through its end surface.

Figure 3:
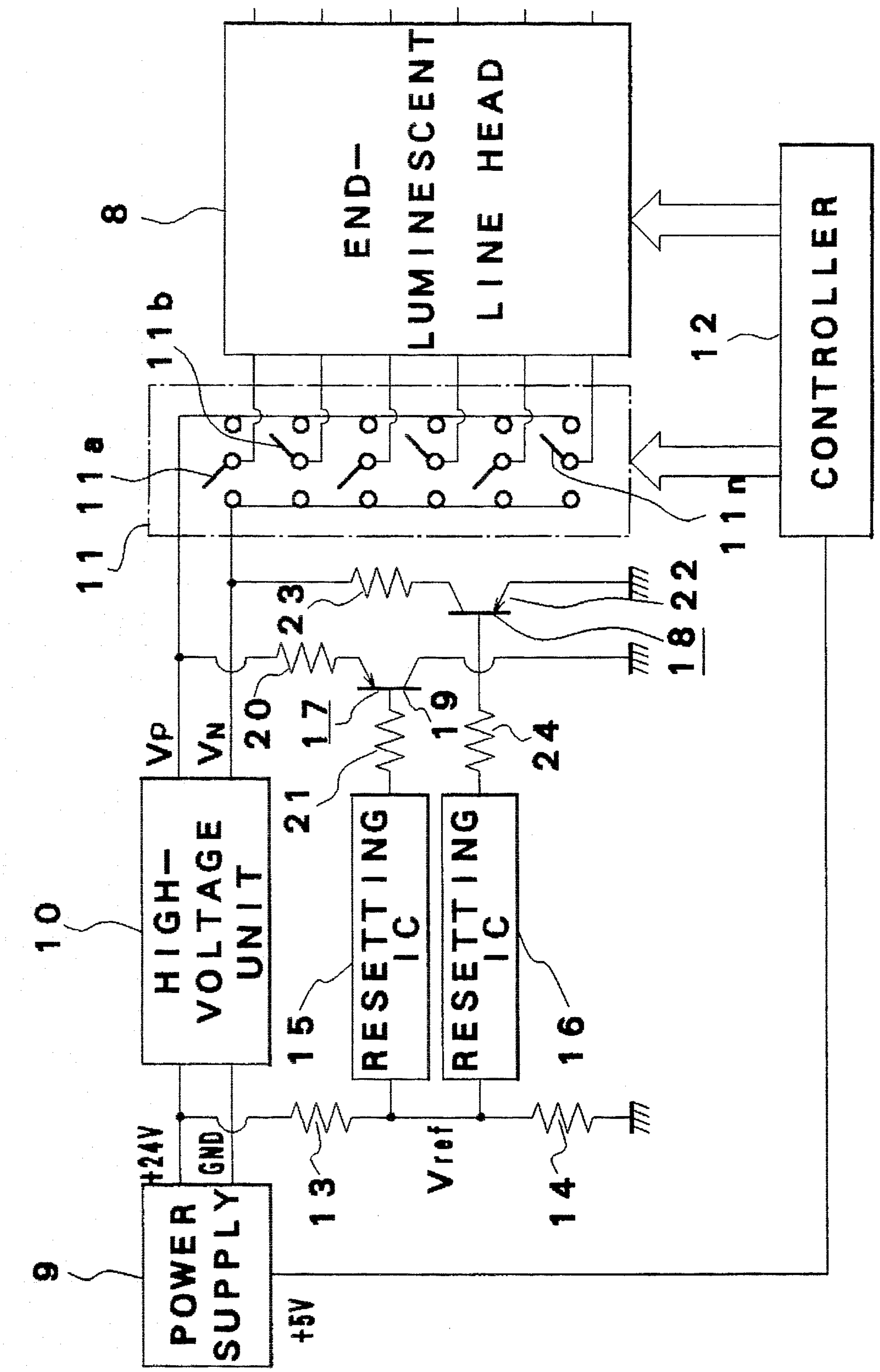
FIG. 3 is a block diagram of an electronic driving circuit for driving the end-luminescent line head.

Referring to FIG. 3, a driving device drives the m×n end-luminescent EL elements 6 of the end-luminescent line head 8 through m common electrodes and n channel electrodes. The driving device has a power supply 9, a high-voltage unit 10 and a common driver 11, which are connected sequentially. The common driver 11 comprises a plurality of switches 11*a*, 11*b*, . . . and 11*n* to apply a positive voltage $V_P$ and a negative voltage $V_N$ alternately to the common electrodes of the end-luminescent line head 8. Actually, the switches 11*a*, 11*b*, . . . and 11*n* typically illustrated in FIG. 3 are transistor switches controlled by a controller 12. The output terminals of the switches 11*a*, 11*b*, . . . and 11*n* are connected respectively to the common electrodes of the end-luminescent EL elements 6 of the end-luminescent line head 8. The channel circuit of the end-luminescent line head 8 is connected to a channel driver included in the controller 12. The channel driver comprises a transistor circuit for selectively applying a voltage to the channel electrodes of the end-luminescent line head 8 according to print signals provided by the controller 12.

The power supply 9 applies a logic voltage of +5 V to the control circuit of the controller 12.

Series-connected resistors 13 and 14 are connected to the positive output terminal of the power supply 9 to set a reference voltage $V_{ref}$. Resetting ICs 15 and 16, i.e., voltage detectors, are connected to a line interconnecting the resistors 13 and 14. Discharge devices 17 and 18 are closed by the outputs of the resetting ICs 15 and 16, respectively. The discharge device 17 comprises a PNP transistor 19 and a resistor 20; the transistor 19 has an emitter connected through a resistor 20 to the positive output terminal of the high-voltage unit 10 at which the positive voltage $V_P$ appears, a collector connected to a ground, and a base connected through a resistor 21 to the resetting IC 15. The other discharge device 18 comprises a PNP transistor 22 and a resistor 23; the transistor 22 has a collector connected through a resistor 23 to the negative output terminal of the high-voltage unit 10 at which the negative voltage $V_N$ appears, an emitter connected to the ground, and a base connected through a resistor 24 to the resetting IC 16.

The power supply applies the voltage of 24 V to the high-voltage unit 10 and the logic voltage of +5 V to the controller 12. Then, the high-voltage unit 10 applies the positive voltage $V_P$ and the negative voltage $V_N$ to the common driver 11, and the common driver 11 is controlled by the controller 12 to apply the positive voltage $V_P$ and the negative voltage $V_N$ alternately to the common electrodes of the end-luminescent line head 8. The channel driver of the controller 12 applies voltages corresponding to print signals selectively to the channel electrodes of the end-luminescent line head 8. When the voltages applied to the common electrode and the channel electrode of the end-luminescent EL element 6 exceed a fixed threshold, the end-luminescent EL element 6 emits light. The controller controls transistor switches of the channel driver and the common driver 11 for synchronous operation to drive the end-luminescent EL elements 6 selectively for light emission.

Figure 4:
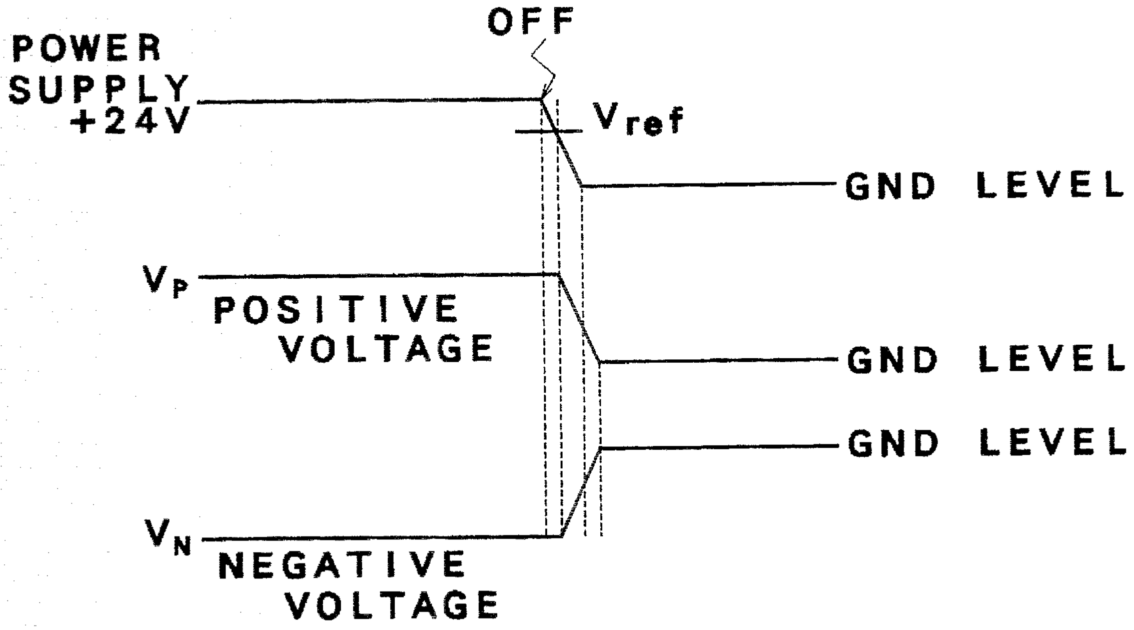
FIG. 4 is a time chart showing the variation of the respective outputs of a power supply and a high-voltage unit when the power supply is turned off.

When the power supply 9 is turned off, the output voltage of 24 V of the power supply 9 drops sharply and, consequently, the reference voltage $V_{ref}$ drops sharply. Then, the resetting ICs 15 and 16 detect the drop of the reference voltage $V_{ref}$ and applies detection signals (LOW signals) to the bases of the transistors 19 and 22, respectively, to turn on the transistors 19 and 22. Consequently, the output terminals of the high-voltage unit 10 are connected to the ground and the output voltages $V_P$ and $V_N$ of the high-voltage unit 10 drop to GND to discharge the high-voltage unit 10. Accordingly, as shown in FIG. 4, application of the output voltages $V_P$ and $V_N$ of the high-voltage unit 10 to the common driver 11 is interrupted immediately after the power supply 9 has been turned off. Thus, application of the output voltages $V_P$ and $V_N$ to the common driver 11 and that of the logic voltage to the controller 12 are interrupted substantially simultaneously to prevent the unstable operation of the transistor switches of the common driver 11, so that the common driver 11 and the end-luminescent line head 8 are protected from destruction.

Since the driving device employs the resetting ICs 15 and 16 as voltage detectors, and the discharge devices 17 and 18 comprise the transistors 19 and 20, the voltage detectors and the discharge devices 17 and 18 can be formed in a comparatively small size at a comparatively low cost. Since the resetting ICs 15 and 16 are connected to a line interconnecting the power supply 9 and the high-voltage unit 10 and a comparatively low secondary voltage is applied thereto, the resetting ICs 15 and 16 can be designed without taking creepage distance into consideration. Furthermore, since the discharge devices 17 and 18 are connected to lines interconnecting the high-voltage unit 10 and the common driver 11, the driving device has a circuit configuration simpler than a circuit configuration in which the discharge devices 17 and 18 are connected to lines interconnecting the common driver 11 and the end-luminescent line head 8.

In a modification, the driving device may be provided with a voltage detector for detecting the drop of the logic voltage instead of the resetting ICs 15 and 16 for detecting the output voltages of the power supply 9 applied to the high-voltage unit 10. The discharge devices 17 and 18 shown in FIG. 3 may be connected to lines connecting the common driver 11 to the end-luminescent line head 8.

A driving device in a second embodiment according to the present invention will be described hereinafter with reference to FIG. 5, in which parts like or corresponding to those previously described with reference to FIGS. 1 to 4 are denoted by the same reference characters and the description thereof will be omitted.

Figure 5:
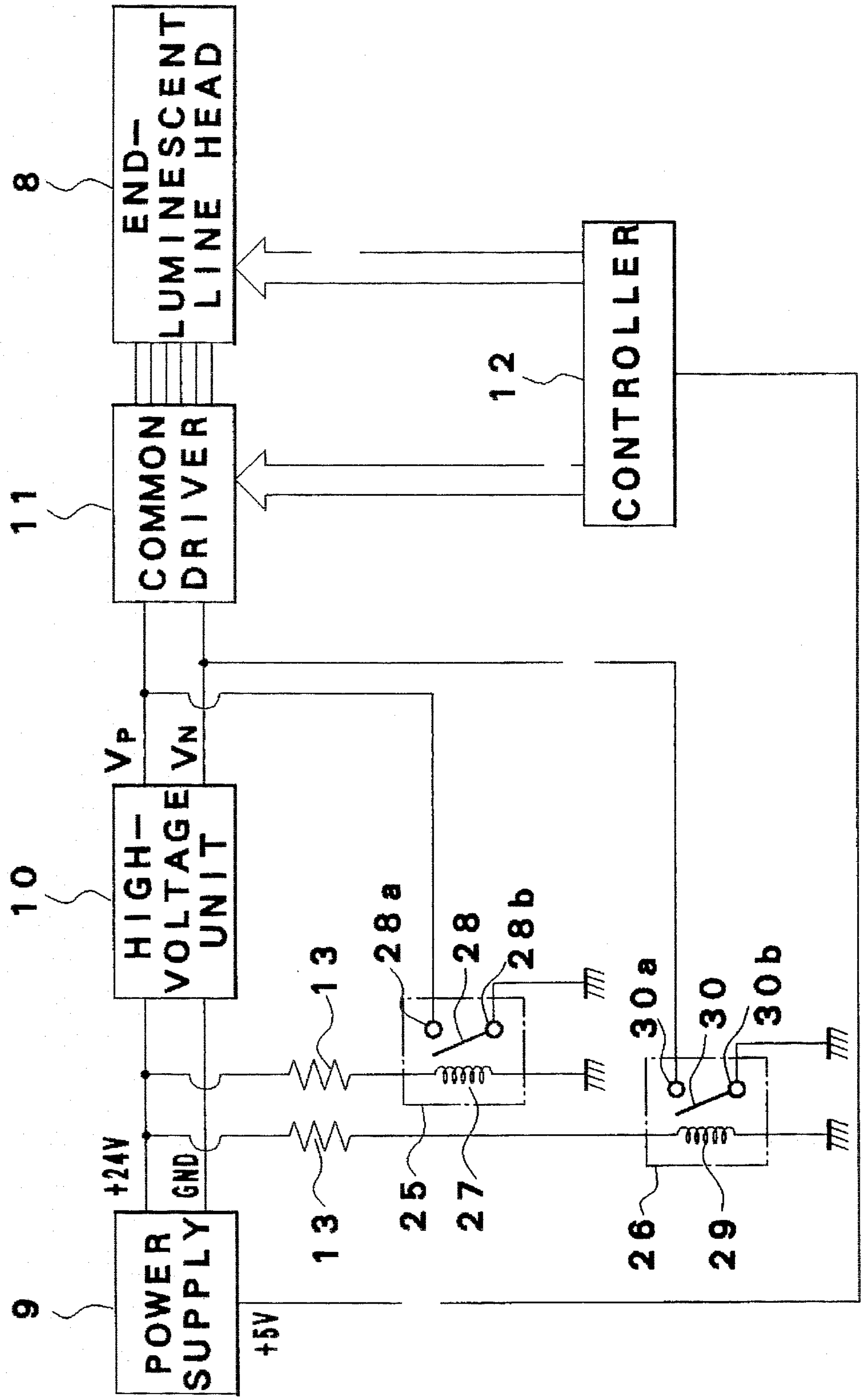
FIG. 5 is a block diagram of the electronic circuit of a driving device in a second embodiment according to the present invention.
Figure 6:
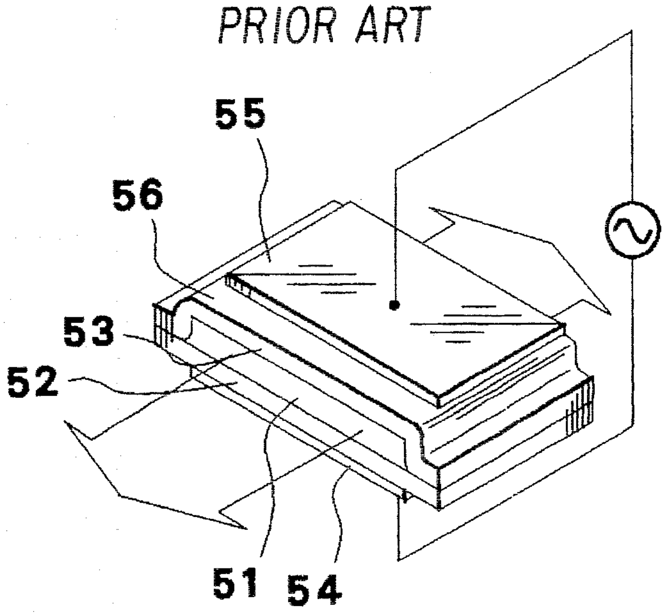
Fig. 6 PRIOR ART
FIG. 6 is a perspective view of a known end-luminescent EL element.
Figure 7:
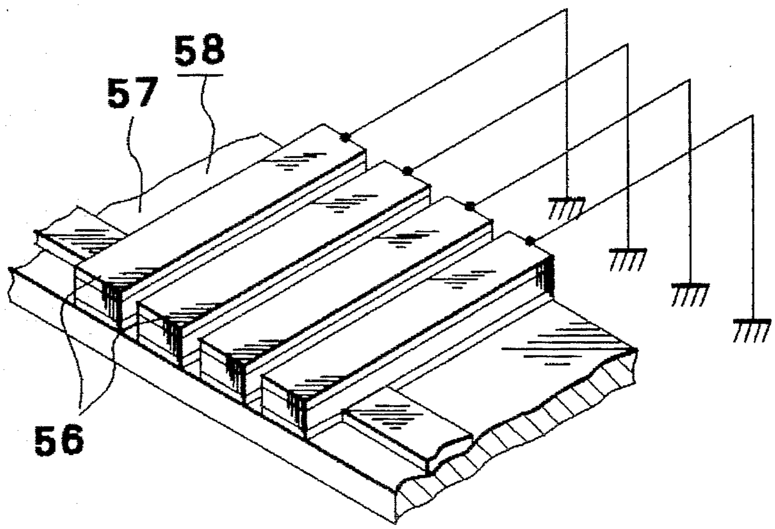
Fig. 7 PRIOR ART
FIG. 7 is a fragmentary perspective view of a known end-luminescent line head provided with end-luminescent EL elements.
Figure 8:
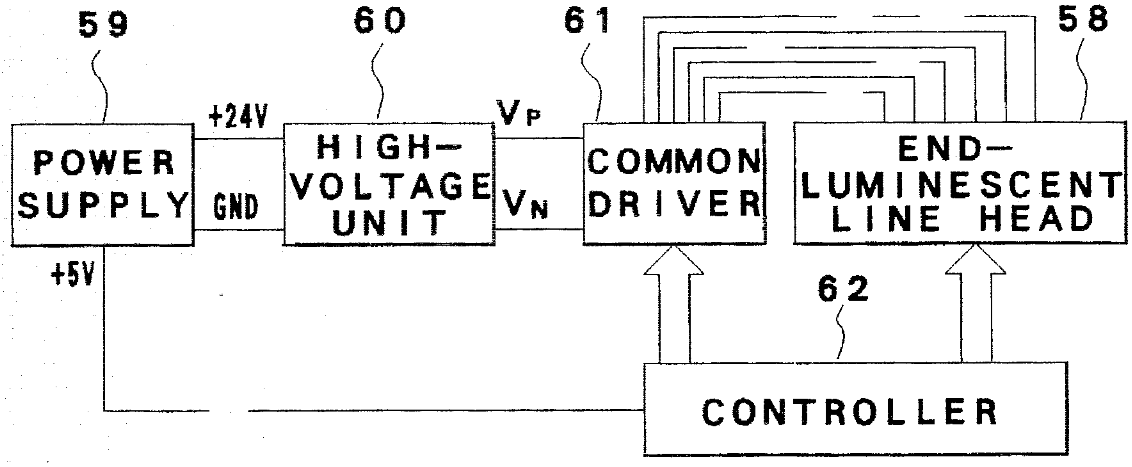
Fig. 8 PRIOR ART
FIG. 8 is a block diagram of an electronic driving circuit for driving an end-luminescent line head.
Figure 9:
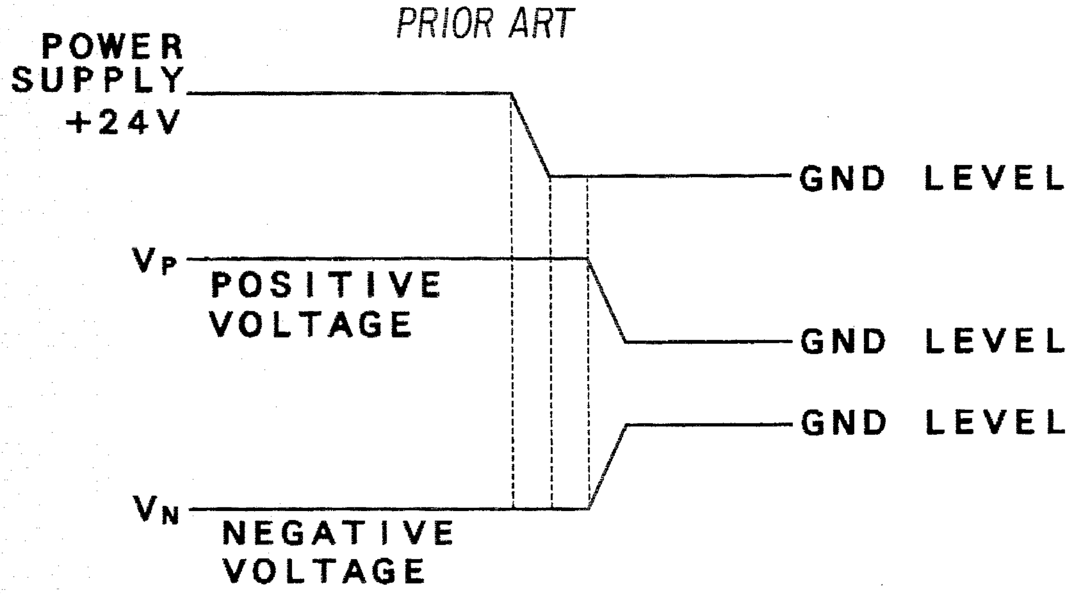
Fig. 9 PRIOR ART
FIG. 9 is a time chart showing the variation of the respective outputs of a power supply and a high-voltage unit when the power supply is turned off.

Referring to FIG. 5, relays 25 and 26, which serve as voltage detectors, are connected through resistors 13 to the positive output terminal of a power supply 9. The relay 25 has a coil 27 for detecting the drop of the output voltage of the power supply 9, and a switch 28 which is held open while the coil 27 is energized. The switch 28 has a contact 28*a* connected to an output terminal of a high-voltage unit 10 at which a positive voltage $V_P$ appears and the other contact 28*b* connected to a ground. The other relay 26 has a coil 29 for detecting the drop of the output voltage of the power supply 9 and a switch 30 which is held open while the coil 29 is energized. The switch 30 has a contact 30*a* connected to another output terminal of the high-voltage unit 10 at which a negative voltage $V_N$ appears and the other contact 30*b* connected to the ground.

The power supply 9 is turned on to drive the end-luminescent line head 8. The operation of the driving device for driving the end-luminescent line head 8 is similar to that of the driving device in the first embodiment. When the power supply 9 is turned off, the output voltage of 24 V of the power supply 9 drops and the coils 27 and 29 are deenergized and, consequently, the switches 28 and 30 are closed to discharge the high-voltage unit 10 instantly so that the positive voltage $V_P$ drops to GND and the negative voltage $V_N$ rises to GND. Thus, application of the voltages $V_P$ and $V_N$ to the common driver 11 is interrupted immediately after the power supply 9 has been turned off to protect the common driver and the end-luminescent line head 8 from destruction.

The relay 25 consisting of the coil 27 and the switch 28, and the relay 26 consisting of the coil 29 and the switch 30 and serving as voltage detectors are simple in construction. The respective contacts 28*a* and 30*a* of the switches 28 and 29 may be connected to lines connecting the common driver 11 to the end-luminescent line head 8.

What is claimed is:

1. A driving device for driving an end-luminescent line head provided with an array of a plurality of end-luminescent EL elements, said driving device comprising:

a power supply having an output side;

a high-voltage unit having an input side connected to the output side of the power supply to receive power from the power supply, and output terminals at which a positive voltage and a negative voltage appear, respectively;

a driver having an input side connected to the output terminals of the high-voltage unit and an output side connected to the end-luminescent line head;

voltage detecting means connected to said output of said power supply for detecting a drop of an output voltage of the power supply; and means for grounding having one side connected to the output side of the high-voltage unit and the other side connected to ground, and being closed when the voltage detecting means detects the drop of the output voltage of the power supply so as to connect the output side of the high voltage unit to ground.

2. A driving device according to claim 1, wherein the driver is a common driver for driving the common electrodes of the end-luminescent line head.

3. A driving device according to claim 1, wherein the voltage detecting means are resetting ICs which provide reset signals upon the drop of the output voltage of the power supply below a reference voltage, and the means for grounding are transistors each having one terminal connected to the output side of the high-voltage unit, a second terminal connected to ground, and a base connected to an output side of one of the resetting ICs, and which is turned on when the reset signal provided by the resetting IC is applied to the base.

4. A driving device according to claim 1, wherein the voltage detecting means are coils connected to the output side of the power supply so as to be energized when the power supply is turned on, and the means for grounding are switches having one contact connected to the output side of the high-voltage unit and the other contact connected to ground, each of said switches being associated with one of said coils and being held open when an associated coil is energized.

5. A driving device according to claim 1, wherein the voltage detecting means are connected to a line interconnecting the power supply and the high-voltage unit.

6. A driving device according to claim 1, wherein the discharge means are connected to lines interconnecting the high-voltage unit and the driver.

* * * * *